US009512895B2

(12) United States Patent
Behmenburg et al.

(10) Patent No.: US 9,512,895 B2
(45) Date of Patent: Dec. 6, 2016

(54) AIR SPRING HAVING HYBRID BELLOWS

(75) Inventors: Christof Behmenburg, Lauenau (DE);
Jens Uwe Gleu, Langenhagen (DE);
Andreas Kind, Hildesheim (DE); Dirk Kröger, Hannover (DE); Andreas Nessel, Isernhagen (DE); Reiner Waschk, Hannover (DE)

(73) Assignee: Continental Teves AG & Co. oHG (DE)

( * ) Notice: Subject to any disclaimer, the term of this patent is extended or adjusted under 35 U.S.C. 154(b) by 72 days.

(21) Appl. No.: 14/009,401

(22) PCT Filed: Apr. 3, 2012

(86) PCT No.: PCT/EP2012/056060
§ 371 (c)(1),
(2), (4) Date: Oct. 2, 2013

(87) PCT Pub. No.: WO2012/136650
PCT Pub. Date: Oct. 11, 2012

(65) Prior Publication Data
US 2014/0027962 A1    Jan. 30, 2014

(30) Foreign Application Priority Data

Apr. 6, 2011  (DE) .................. 10 2011 006 886
May 4, 2011  (DE) .................. 10 2011 075 258
Jan. 26, 2012  (DE) .................. 10 2012 201 104

(51) Int. Cl.
*F16F 9/04* (2006.01)
*F16F 5/00* (2006.01)

(52) U.S. Cl.
CPC ........... *F16F 9/0409* (2013.01); *F16F 9/0418* (2013.01); *F16F 9/0445* (2013.01)

(58) Field of Classification Search
CPC .......... F16F 9/04; F16F 9/0409; F16F 9/0418; F16F 9/0436; F16F 9/0445; F16F 9/05; B29D 22/023
(Continued)

(56) References Cited

U.S. PATENT DOCUMENTS 2,192,355 A * 3/1940 Kuhn ............................. 267/35
3,081,075 A * 3/1963 Selman ..................... 267/64.24
(Continued)

FOREIGN PATENT DOCUMENTS

DE    1914476    10/1969
DE    196 14 476    10/1997
(Continued)

OTHER PUBLICATIONS

International Search Report corresponding to PCT/EP2012/056060 dated Sep. 6, 2012.

*Primary Examiner* — Melody Burch
(74) *Attorney, Agent, or Firm* — RatnerPrestia

(57) ABSTRACT

An air spring assembly for a motor vehicle, including an air spring, a rolling piston, a tubular rolling air spring bellows arranged concentrically about a central longitudinal axis of the air spring, and an air spring cover. A first partial air spring bellows has a first embedded textile reinforcement and a second partial air spring bellows has a second embedded textile reinforcement The first textile reinforcement has first reinforcing threads, the preferred axis of which extends parallel or nearly parallel to the axis of the central longitudinal axis of the air spring The second textile reinforcement has second reinforcing threads, the first preferred axis of which extends obliquely to the longitudinal axis of the air spring and the second preferred axis of which extends
(Continued)

US 9,512,895 B2

Page 2 obliquely to the longitudinal axis of the air spring, wherein the first and the second preferred axis are at an angle to each other.

9 Claims, 3 Drawing Sheets

(58) Field of Classification Search
USPC .......... 267/64.19, 64.21, 64.23, 64.24, 64.27
See application file for complete search history.

(56) References Cited

U.S. PATENT DOCUMENTS

| | | | |
|---|---|---|---|
| 3,490,716 A | | 1/1970 | Miller |
| 3,522,940 A | * | 8/1970 | Nijhuis ............................ 267/34 |
| 4,425,699 A | * | 1/1984 | Nordin .................... B21K 25/00 277/399 |
| 5,080,328 A | * | 1/1992 | Pees ........................ B29D 22/02 267/122 |
| 5,975,506 A | | 11/1999 | Thurow et al. |
| 6,382,602 B1 | * | 5/2002 | Morrow ..................... 267/64.23 |
| 6,651,995 B1 | * | 11/2003 | Buttner .................. 280/124.157 |
| 2002/0063366 A1 | * | 5/2002 | Oldenettel et al. ........ 267/64.24 |
| 2003/0020218 A1 | | 1/2003 | Oldenettel |
| 2004/0100032 A1 | | 5/2004 | Webber et al. |
| 2006/0006590 A1 | * | 1/2006 | Brookes ..................... 267/64.27 |
| 2008/0177011 A1 | * | 7/2008 | Tamura .......................... 525/471 |
| 2010/0001446 A1 | * | 1/2010 | Oldenettel ............ F16F 9/0445 267/122 |
| 2011/0083500 A1 | * | 4/2011 | Rensel et al. .............. 73/117.03 |

FOREIGN PATENT DOCUMENTS

| | | |
|---|---|---|
| DE | 100 09 912 | 3/2000 |
| DE | 10 2007 004 035 | 7/2008 |
| DE | 102012201104 A1 | 4/2013 |
| EP | 1 285 181 | 2/2003 |
| EP | 2 090 801 | 8/2009 |
| GB | 2 456 750 | 7/2009 |

* cited by examiner

AIR SPRING HAVING HYBRID BELLOWS

CROSS REFERENCE TO RELATED APPLICATIONS

This application is the U.S. National Phase Application of PCT International Application No. PCT/EP2012/056060, filed Apr. 3, 2012, which claims priority to German Patent Application No. 10 2011 006 886.4, filed Apr. 6, 2011, German Patent Application No. 10 2011 075 258.7, filed May 4, 2011 and German Patent Application No. 10 2012 201 104.8, filed Jan. 26, 2012, the contents of such applications being incorporated by reference herein.

FIELD OF THE INVENTION

The invention relates to an air spring assembly for a motor vehicle.

BACKGROUND OF THE INVENTION

On axles of a motor vehicle, e.g. front axle multi-link axles, torsional and cardanic movements generated by steering and spring movements in a spring strut representing a connecting element between the axle and the body of the vehicle are transmitted. The spring strut must therefore be designed to absorb these disturbing movements without damage to the component elements of the spring strut. As a rule, therefore, a spring strut has flexible component elements, e.g. an air spring bellows, preferably embodied as a tubular rolling bellows.

In previous embodiments of an air spring, use is made of an air spring bellows which has a small number of layers of textile reinforcements and is configured as an externally guided variant. In spring strut embodiments which are now customary, the air spring bellows generally has two layers of textile reinforcements, in which the respective reinforcing threads are arranged crosswise at a defined angle, e.g. 70°, to the central longitudinal axis of the spring strut. To compensate for the torsional stiffness to which this gives rise, the air bellows of current spring struts often additionally have a cardanic fold, wherein this exposed region between an air spring cover and the outer guide of the spring strut is reinforced by additional textile and/or elastomer layers laid crosswise. The air spring bellows of known spring struts are of basically continuous construction from the air spring cover to the piston clamping location on the rolling piston side.

As a rule, therefore, known embodiments of the spring struts are generally torsionally stiff. This means that they can absorb torsional movements only to a limited extent in the region of a rolling and/or cardanic fold. Relatively large torsional loads thus lead to premature failure of the air spring bellows in the region of the rolling folds.

To reduce the torsional stiffness of the spring struts, use is made in the prior art of air spring bellows designs in which the reinforcing threads of the textile reinforcements preferably extend approximately parallel to the central longitudinal axis of the spring struts. However, to meet the conflicting requirements in respect of comfort, air spring bellows of this kind are generally embodied with textile reinforcements in just one layer. Satisfying the requirements in respect of comfort and reducing torsional stiffness represent conflicting aims, entailing methods of construction for the air spring bellows which differ and which have hitherto not been achievable in any air spring bellows of unitary construction.

Publications EP 1 285 181 B1 and DE 100 09 912 C1, both incorporated by reference, represent the prior art in respect of the air spring assembly.

SUMMARY OF THE INVENTION

Therefore, aspects of the invention provide an improved air spring assembly.

An aspect underlying the invention is in each case achieved by means of features of the independent patent claim. Preferred embodiments of the invention are indicated in the dependent patent claims.

An air spring assembly for a motor vehicle is provided, comprising an air spring, an air spring bellows, an air spring cover, and a rolling piston, wherein the air spring bellows is a tubular rolling bellows, wherein the air spring bellows is arranged concentrically about a central longitudinal axis of the air spring, between the air spring cover and the rolling piston, wherein the air spring bellows has a first partial air spring bellows and a second partial air spring bellows, wherein the first partial air spring bellows partially encloses an air volume at the end of the air spring on the cover side, wherein the second partial air spring bellows encloses the air volume at the end of the air spring on the rolling piston side, wherein the first partial air spring bellows has a first embedded textile reinforcement, wherein the second partial air spring bellows has a second embedded textile reinforcement, wherein the first textile reinforcement has first reinforcing threads, the preferred axis of which extends parallel or nearly parallel to the axis of the central longitudinal axis of the air spring, wherein the second textile reinforcement has second reinforcing threads, the first preferred axis of which extends obliquely to the longitudinal axis of the air spring and the second preferred axis of which extends obliquely to the longitudinal axis of the air spring, wherein the first and the second preferred axis are at an angle to each other.

This can have the advantage that seemingly contrary aims, such as satisfying requirements in respect of comfort and reducing torsional stiffness, can be achieved simultaneously and without mutual restrictions. Through its combination of a first partial air spring bellows of cross-layer construction for satisfying the requirements in respect of comfort and of a second partial air spring bellows of axial construction for ensuring absorption of torsional and cardanic movements, the air spring assembly described exhibits effective decoupling of a "rolling region" and an "elasticity region". The "hybrid bellows" thus formed therefore simultaneously meets requirements in respect of comfort and exhibits a reduction in torsional stiffness.

According to one embodiment of the invention, the first partial air spring bellows comprises a first elastomer blend, and the second partial air spring bellows comprises a second elastomer blend, wherein the first elastomer blend differs from the second elastomer blend or the first elastomer blend is identical with the second elastomer blend, wherein the first elastomer blend comprises at least one first elastomer layer, and the second elastomer blend comprises at least one second elastomer layer.

This can have the advantage that it is possible, by means of a suitable elastomer blend with different elastic moduli in each case, to take account of the various requirements on the air spring bellows, i.e. satisfying requirements in respect of comfort and reducing torsional stiffness. Here, it is possible not only to ensure variable adaptation to a particular degree of satisfaction of the respective requirement through selecting a particular elastomer blend but also to meet the respective requirements as appropriate through selecting a particular number of elastomer layers. The hybrid bellows thus has a high degree of variability and adaptability to the respective requirements on the spring struts.

According to one embodiment of the invention, the first partial air spring bellows comprises a first number of layers of the first embedded textile reinforcements and/or of the first elastomer layers, and the second partial air spring bellows comprises a second number of layers of the second embedded textile reinforcements and/or of the second elastomer layers, wherein the first number of layers differs from the second number of layers, wherein the first and second elastomer layers are designed to seal off the air volume from an external environment.

This can have the advantage that a suitable number of layers of embedded textile reinforcements and/or elastomer layers could be used in the two air spring bellows, depending on requirements on the air spring bellows. In order to satisfy the requirement in respect of comfort to a high degree, for example, the second partial air spring bellows could have a plurality of layers of textile reinforcements with reinforcing threads arranged crosswise in the rolling region. For a significant reduction in torsional stiffness, in contrast, the first partial air spring bellows could have a plurality of layers of textile reinforcements with reinforcing threads extending parallel to the central longitudinal axis of the spring strut in the elasticity region to give a significant reduction in torsional stiffness and could have a plurality of elastomer layers for sealing off the air volume enclosed by the rolling bellows. Once again, the hybrid bellows constructed in this way exhibits maximum flexibility and adaptability to the respective requirements as regards its construction.

According to one embodiment of the invention, the first partial air spring bellows comprises at least as many layers of first embedded textile reinforcements as the second partial air spring bellows.

This can have the advantage that the hybrid bellows could have a reinforced structure in the elasticity region thereof in comparison with the rolling region. Previous spring strut designs, which are distinguished by a thin bellows structure in the rolling region, would thus need little modification in the rolling region if a previous rolling bellows were being replaced by the hybrid bellows described. At the same time it would be possible to effect reinforcement by reinforcing the first partial air spring bellows by increasing the number of first embedded textile reinforcements with spring reinforcements extending parallel to the longitudinal axis of the spring struts, for example. The torsional stiffness of the air spring bellows would thereby be significantly reduced.

According to one embodiment of the invention, the first and the second elastomer layer form a common elastomer layer or the first and the second elastomer layer are segmented.

This can have the advantage that it is possible either to give greater weight to the sealing function of the air spring bellows or to place more emphasis on achieving the comfort characteristics. Moreover, it is possible to vary whether force transmission from the first partial air spring bellows to the second partial air spring bellows shall be intensified or reduced.

According to one embodiment of the invention, a first angle of the first preferred axis of the second reinforcing threads and a second angle of the second preferred axis of the second reinforcing threads vary relative to the longitudinal axis of the air spring within the second partial air spring bellows.

This can have the advantage that different requirements in respect of comfort could be satisfied by the respectively appropriate path of the reinforcing threads of the textile reinforcements. Once again, the hybrid bellows is distinguished by freedom in the combination of bellows structures as regards the reinforcements, even within one partial air spring bellows.

According to one embodiment of the invention, the first partial air spring bellows has a system of folds, wherein the system of folds comprises one fold, wherein the fold is formed by folding the layers of the first embedded textile reinforcements and/or of the first elastomer layers, wherein the fold has an apex line and at least one trough line when viewed from the central longitudinal axis of the air spring, wherein the apex line and the at least one trough line extend concentrically around the central longitudinal axis of the air spring, wherein the apex line corresponds to a maximum radius of the first partial air spring bellows and the trough line corresponds to a minimum radius of the first partial air spring bellows.

This can have the advantage that the cardanic fold formed in the elasticity region of the air spring bellows additionally contributes to reducing torsional stiffness and to improved tolerance of cardanic movements. By this means too, it is possible to counteract premature failure of the air spring bellows due to disturbing torsional and cardanic movements. The cardanic fold of the hybrid bellows thus also contributes to an extension in the service life of the air bellows.

According to one embodiment of the invention, the first partial air spring bellows has a system of folds, wherein the system of folds comprises at least two folds, wherein the at least two folds are formed by folding the layers of the first embedded textile reinforcements and/or of the first elastomer layers, wherein the at least two folds have two apex lines and a common trough line when viewed from the central longitudinal axis of the air spring, wherein the at least two apex lines and the at least one trough line extend concentrically around the longitudinal axis of the air spring, wherein the at least two apex lines correspond to maximum radii of the first partial air spring bellows and the at least one trough line corresponds to a minimum radius of the first partial air spring bellows, wherein the system of folds comprises a constriction of the first partial air spring bellows to form the one trough line, wherein the constriction is designed to accommodate a ring or a cord bandage.

This can have the advantage that the first partial air spring bellows, which has a parallel arrangement of the reinforcing threads to the central longitudinal axis of the spring strut, is stabilized against transversely acting forces. The first partial air spring bellows would thus not only provide spring support against torsional movements and cardanic movements but would also be reinforced as regards its robustness with respect to transversely acting lateral forces. Moreover, the system of folds would be stabilized in respect of the configuration thereof.

According to one embodiment of the invention, the constriction is designed in such a way that the ring can be accommodated positively in the axial direction.

This can have the advantage that, in the case of the multi-fold form of the elasticity region of the first partial air spring bellows, axial stabilization of the air spring bellows can simultaneously be ensured by means of the ring, which lies positively in the constriction in the axial direction.

According to one embodiment of the invention, the first partial air spring bellows has an elastically deformable counterholder on the inside thereof, at the at least one trough line of the system of folds, wherein the counterholder is designed to accommodate the ring positively with at least one of the layers of the first embedded textile reinforcements and/or of the first elastomer layers.

This can have the advantage that an additional elasticity for absorbing forces acting transversely to the longitudinal axis of the air spring strut could be integrated into the elasticity region of the hybrid bellows. Thus, the counterholder could be of elastically deformable configuration, for example, so ensuring that, under the action of forces acting perpendicularly to the longitudinal axis of the spring strut, the outer ring is pressed onto the air spring bellows when the counterholder springs back.

According to one embodiment of the invention, the ring is embedded in at least one of the at least one first textile and/or elastomer layers of the first partial air spring bellows.

This can have the advantage that, despite being fixed in a stable manner within at least one textile and/or one elastomer layer, the ring could accompany the oscillation of the elastomer layers both in an oscillating motion oriented transversely to the longitudinal axis of the spring strut and in the case of an oscillating motion of the air spring bellows taking place parallel to the longitudinal axis of the air spring strut in the elasticity region of said air spring bellows.

According to one embodiment of the invention, the air spring assembly further comprises a cylindrical outer guide of the air spring, wherein the longitudinal axis of the outer guide is congruent with the central longitudinal axis of the air spring, wherein the outer guide partially surrounds the air spring bellows, wherein the first partial air spring bellows and the second partial air spring bellows are fixed to an inner wall of the outer guide by being vulcanized together, adhesively bonded and/or by means of a clamping ring in the area of overlap of the first partial air spring bellows and the second partial air spring bellows, wherein the first partial air spring bellows and the second partial air spring bellows are fixed to one another by the vulcanization process, by the adhesive bonding process and/or by the clamping ring.

This can have the advantage that a stable connection could be created in the area of overlap of the first partial air spring bellows and the second partial air spring bellows. In particular, it would be possible, after assembly, for the first partial air spring bellows and the second partial air spring bellows to be connected in a vulcanizing process to form a single end product. Thus, there might no longer be a need, particularly in the case where the first partial air spring bellows and the second partial air spring bellows are vulcanized together, for a connection of these two further components to create a connection. This would lead to a reduction in the weight of the air spring strut and to a reduction in production costs. Dispensing with further components also results in considerable advantages when transporting the spring strut. In another possible embodiment, in which the system of folds would consist of just one fold, costs could be reduced once again while maintaining very good flexibility of the bellows application.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
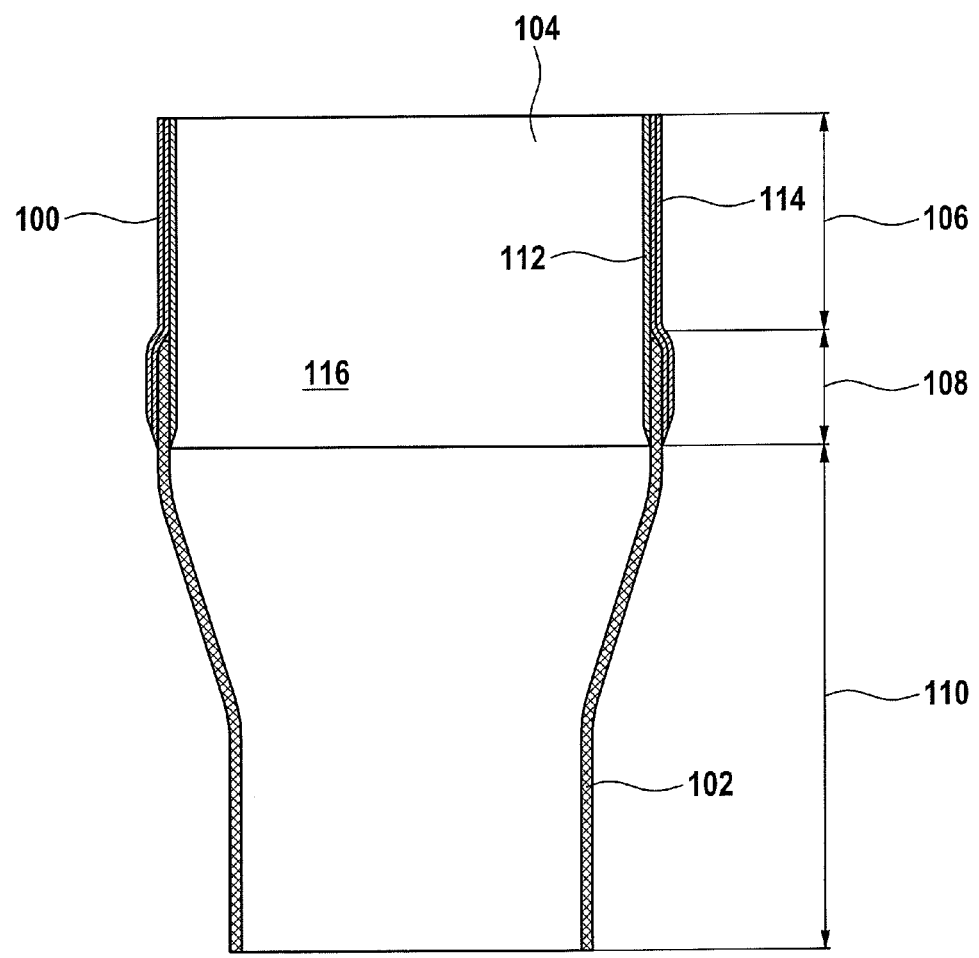
FIG. 1 shows a hybrid bellows.

FIG. 1 shows a hybrid bellows 104 comprising a first partial air spring bellows 100 and a second partial air spring bellows 102. The hybrid bellows has an elasticity region 106 and a rolling region 110. In the area of overlap 108, the first partial air spring bellows 100 and the second partial air spring bellows 102 overlap.

The first partial air spring bellows 100 can consist of one or more textile layers 114. The textile layers have reinforcing threads, the preferred direction of which extends parallel to the central longitudinal axis (214) of the spring strut. As an option, the first partial air spring bellows 100 can have one or more elastomer layers 112 for sealing off the enclosed air volume 116.

The second partial air spring bellows 102 can comprise one or more textile and/or elastomer layers. The textile layers of the second partial air spring bellows 102 could have a cross-layer structure, i.e. the preferred axes of the reinforcing threads extend obliquely to the longitudinal axis (214) of the spring strut and at an angle to one another.

Thus, the hybrid bellows 104 tends to absorb torsional and cardanic movements more in the elasticity region 106 thereof. In the rolling region 110 thereof, the hybrid bellows 104 primarily satisfies requirements in respect of comfort.

Sufficient overlapping and connection could be established in the area of overlap 108 by vulcanization during the production process and/or by adhesive bonding of the first partial air spring bellows 100 and of the second partial air spring bellows 102, allowing forces to be transmitted directly via elastomer layers of the first partial air spring bellows 100 and of the second partial air spring bellows 102.

At the same time, an inner rubber layer could be applied continuously from the rolling region 110 to the elasticity region 106 or split between the two regions, for example. The degree of transmission of forces between the two partial air spring bellows could thus be varied.

In the elasticity region 106, a textile layer calendered from a rubber could be laid on a cross-layer preform of the rolling region 110 in a winding process. This could take place at an assembly diameter which corresponded to the assembly diameter of a preform of the rolling region 110, to the diameter of the vulcanized end product or to an intermediate diameter.

In one embodiment of the invention, a preform of the elasticity region 106 could have been produced by joint-free continuous assembly on a suitable diameter. The preform for the elasticity region 106 would then be combined with the preform for the rolling region 110 only before vulcanization to give an end product.

The connection of the overlapping regions of the first partial air spring bellows 100 and of the second partial air spring bellows 102 in the area of overlap 108 could preferably be accomplished by means of vulcanization of superposed adhesively bonded boundary surfaces of the first partial air spring bellows 100 and of the second partial air spring bellows 102. Alternative or additional connection of the two partial air spring bellows could be accomplished by clamping in the area of overlap 108 in the course of connection to an outer guide and/or by adhesive bonding with a high-performance adhesive.

Figure 2:
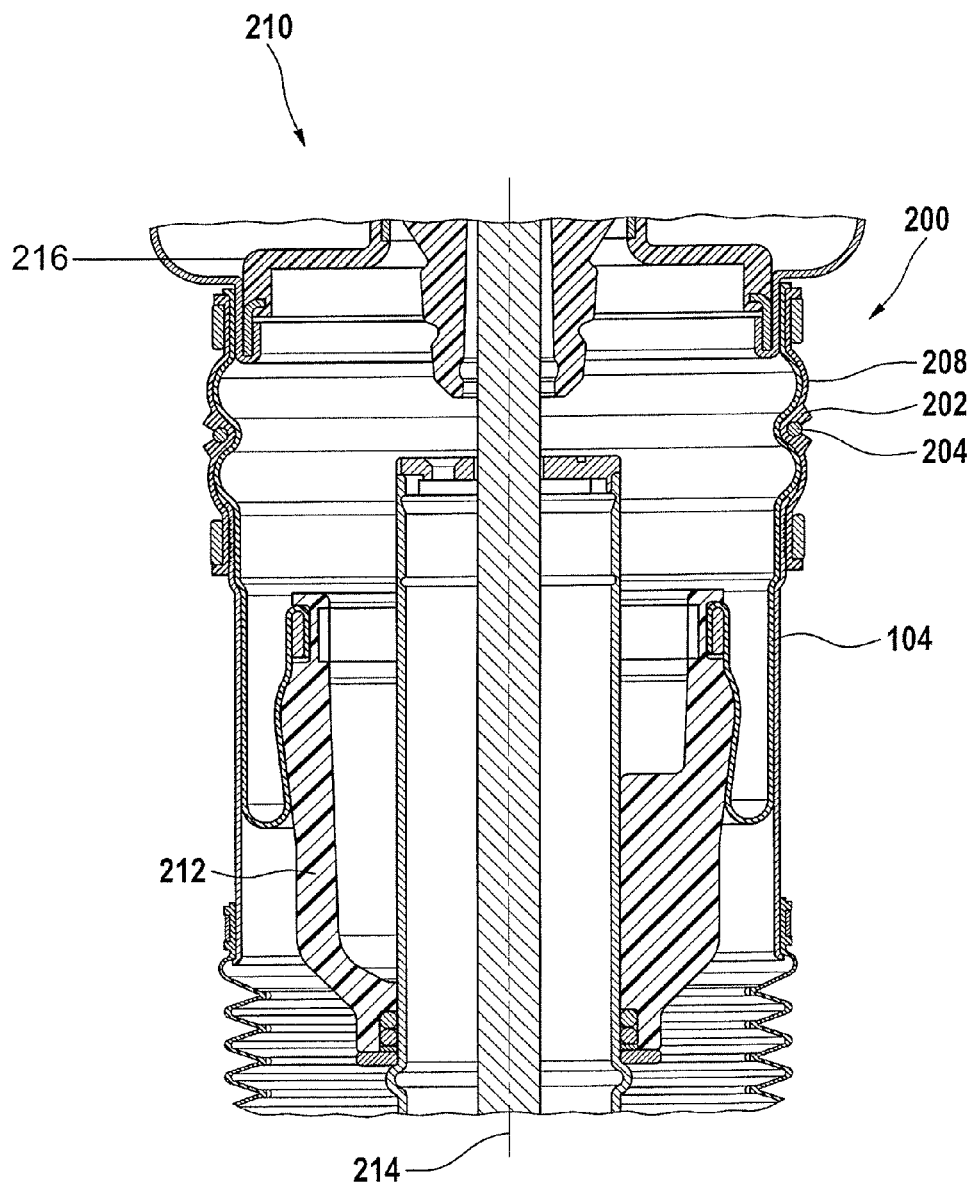
FIG. 2 shows a hybrid bellows having a system of folds on the first partial air spring bellows, FIGS. 3a)-3c) show various embodiments of the positioning of a ring in the region of the constriction in the system of folds of the first partial air spring bellows.

FIG. 2 shows a longitudinal section through an air spring 210 of a spring strut 200. The air spring 210 includes a hybrid bellows 104 and an air spring cover 216. The hybrid bellows 104 has a system of folds 202 comprising two folds 208 in the elasticity region 106 thereof. In the constricted region of the system of folds 202, the hybrid bellows 104 has a ring 204 in the region of the elasticity region 106, said ring being embedded between the layers of the bellows by means of a vulcanization process. The air spring bellows 104 can roll on a rolling piston 212. In the case of air springs which are not free-standing, the central longitudinal axis 214 could be represented by a shock damper tube.

Figure 3:
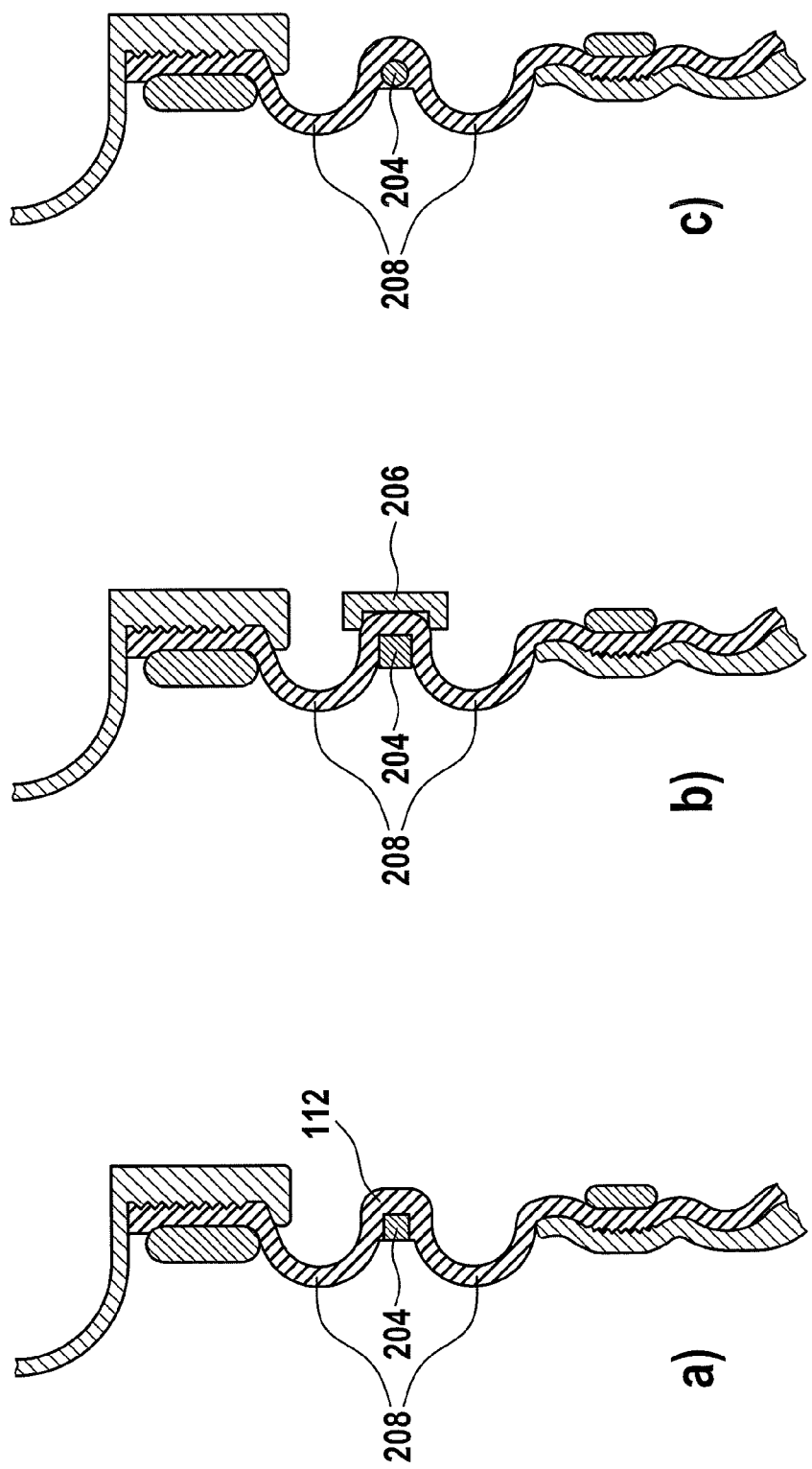

FIGS. 3a)-3c) show various embodiments of the positioning of the ring 204 in the region of the folds 202 of the hybrid bellows 104. Here, the central longitudinal axis 214 of the air spring 210 would in each case be arranged on the right-hand side of the individual partial illustrations 3a), 3b) and 3c), although this is not shown here. The abovementioned apex and trough lines would in each case have to be defined from the perspective of this central longitudinal axis 214 of the air spring 210, which axis is situated on the right of each partial illustration 3a), 3b) and 3c).

In FIG. 3a, the ring 204 is fixed positively by means of corresponding shaping of the elastomer layer 112. The ring 204 is accommodated positively by the shape formed. The corresponding geometrical shaping of the elastomer layer 112 could have been produced in a vulcanization process during the production of the hybrid bellows 104.

FIG. 3b shows clamping of the ring 204 on the outside of the first partial air spring bellows 100 by means of a counterholder 206 on the inside of the first partial air spring bellows 100 in the system of folds 202. Here, the ring 204 could be composed of a plastic material, while the counterholder 206 could be composed of an elastically deformable material. The ring 204 could be pressed onto the first partial air spring bellows 100 in the constricted region of the system of folds 202 by springback of the counterholder 206 caused by forces. The counterholder 206 could furthermore have suitable shaping, e.g. an O shape, in order to enclose the ring toward the outside by means of the inner region of the first partial air spring bellows 100.

FIG. 3c shows embedding of the ring 204 within the elastomer layers (112) of the first partial air spring bellows 100. The ring 204 could have been inserted during production in the context of assembly of the first partial air spring bellows 100 and could have been vulcanized together with the bellows.

In all the embodiments, the ring could take different forms, e.g. could have a circular, angular or oval diameter.

If the system of folds 202 is configured as a multi-fold form, constriction or bandaging of the hybrid bellows 104 is necessary. Here, the requisite constriction can be implemented not only by means of a surrounding ring in various forms and materials but also in the form of a bandage produced by multiple winding of a cord.

LIST OF REFERENCE SIGNS 100 first partial air spring bellows
102 second partial air spring bellows
104 air spring bellows, here: hybrid bellows
106 elasticity region
108 area of overlap
110 rolling region
112 elastomer layer
114 textile layer
116 air volume
200 spring strut
202 system of folds
204 ring
206 counterholder
208 fold
210 air spring
212 rolling piston
214 central longitudinal axis

The invention claimed is:

1. An air spring assembly for a motor vehicle, comprising an air spring, an air spring bellows, an air spring cover, and a rolling piston, wherein the air spring bellows is a tubular rolling bellows, wherein the air spring bellows is arranged concentrically about a central longitudinal axis of the air spring, between the air spring cover and the rolling piston, wherein the air spring bellows has a first partial air spring bellows and a second partial air spring bellows, wherein the first partial air spring bellows partially encloses an air volume at the end of the air spring on the cover side, wherein the second partial air spring bellows encloses an air volume at the end of the air spring on a rolling piston side, wherein the first partial air spring bellows has a first embedded textile reinforcement, wherein the second partial air spring bellows has a second embedded textile reinforcement, wherein the first textile reinforcement has first reinforcing threads, a preferred axis of which extends parallel or nearly parallel to the axis of the central longitudinal axis of the air spring, wherein the second textile reinforcement has second reinforcing threads, a first preferred axis of which extends obliquely to the longitudinal axis of the air spring and a second preferred axis of which extends obliquely to the longitudinal axis of the air spring, wherein the first and the second preferred axis are at an angle to each other, wherein the air spring bellows includes three separate areas arranged in an axial direction of the air spring bellows, a first area of the three areas including the first partial air spring bellows and not the second partial air spring bellows, a second area of the three areas including both the first partial air spring bellows and the second partial air spring bellows arranged in overlapping fashion in a radial direction of the air spring bellows, and a third area of the three areas including the second partial air spring bellows and not the first partial air spring bellows, and wherein the first partial air spring bellows has an elastically deformable counterholder on an innermost surface thereof, wherein the first partial air spring bellows has a system of folds, wherein the system of folds comprises at least two folds, wherein the at least two folds have two apex lines and a common trough line when viewed from the central longitudinal axis of the air spring, wherein the system of folds comprises a constriction of the first partial air spring bellows to form the one trough line, wherein the constriction is designed to accommodate a ring or a cord bandage, wherein the constriction is designed in such a way that the ring can be accommodated positively in the axial direction, and wherein the elastically deformable counterholder is positioned at the at least one trough line of the system of folds, wherein the counterholder is designed to accommodate the ring positively.

2. The air spring assembly as claimed in claim 1, wherein the first partial air spring bellows comprises a first elastomer blend, and the second partial air spring bellows comprises a second elastomer blend, wherein the first elastomer blend differs from the second elastomer blend or the first elastomer blend is identical with the second elastomer blend, wherein the first elastomer blend comprises at least one first elastomer layer, and the second elastomer blend comprises at least one second elastomer layer.

3. The air spring assembly as claimed in claim 2, wherein the first partial air spring bellows comprises a first number of layers of the first embedded textile reinforcement and/or of the first elastomer layer, and the second partial air spring bellows comprises a second number of layers of the second embedded textile reinforcement and/or of the second elastomer layer, wherein the first number of layers differs from the second number of layers, wherein the first and second elastomer layers are designed to seal off the air volume from an external environment.

4. The air spring assembly as claimed in claim 1, wherein the first partial air spring bellows comprises at least as many layers of first embedded textile reinforcements as the second partial air spring bellows.

5. The air spring assembly as claimed in claim 2, wherein the first and the second elastomer layer form a common elastomer layer or wherein the first and the second elastomer layer are segmented.

6. The air spring assembly as claimed in claim 1, wherein a first angle of the first preferred axis of the second reinforcing threads and a second angle of the second preferred axis of the second reinforcing threads vary relative to the longitudinal axis of the air spring within the second partial air spring bellows.

7. The air spring assembly as claimed in claim 3, wherein the at least two apex lines and the at least one trough line extend concentrically around the longitudinal axis of the air spring, wherein the at least two apex lines correspond to maximum radii of the first partial air spring bellows and the at least one trough line corresponds to a minimum radius of the first partial air spring bellows.

8. The air spring assembly as claimed in claim 7, wherein the ring is embedded in at least one of the first number of layers of the first embedded textile reinforcement and/or of the first elastomer layer.

9. The air spring assembly as claimed in claim 1, further comprising a cylindrical outer guide of the air spring, wherein the longitudinal axis of the outer guide is congruent with the longitudinal axis of the air spring, wherein the outer guide partially surrounds the air spring bellows, wherein the first partial air spring bellows and the second partial air spring bellows are fixed to an inner wall of the outer guide by being vulcanized together, adhesively bonded and/or by means of a clamping ring in the second area of the air spring bellows, wherein the first partial air spring bellows and the second partial air spring bellows are fixed to one another by the vulcanization process, by the adhesive bonding process and/or by the clamping ring.

* * * * *